(12) United States Patent
Mielenhausen

(10) Patent No.: US 9,460,142 B2
(45) Date of Patent: Oct. 4, 2016

(54) DETECTING RENAMING OPERATIONS

(71) Applicant: Bjoern Mielenhausen, Walldorf (DE)

(72) Inventor: Bjoern Mielenhausen, Walldorf (DE)

(73) Assignee: SAP AG (DE)

( * ) Notice: Subject to any disclaimer, the term of this patent is extended or adjusted under 35 U.S.C. 154(b) by 191 days.

(21) Appl. No.: 14/273,153

(22) Filed: May 8, 2014

(65) Prior Publication Data

US 2015/0120686 A1    Apr. 30, 2015

Related U.S. Application Data

(60) Provisional application No. 61/896,875, filed on Oct. 29, 2013, provisional application No. 61/896,978, filed on Oct. 29, 2013.

(51) Int. Cl.
*G06F 17/30* (2006.01)
*G06F 11/07* (2006.01)

(52) U.S. Cl.
CPC ....... *G06F 17/30356* (2013.01); *G06F 11/079* (2013.01); *G06F 17/30297* (2013.01)

(58) Field of Classification Search
None
See application file for complete search history.

(56) References Cited

U.S. PATENT DOCUMENTS

| | | |
|---|---|---|
| 5,491,818 A | 2/1996 | Malatesta et al. |
| 6,112,024 A | 8/2000 | Almond et al. |
| 6,954,747 B1 | 10/2005 | Wang et al. |
| 7,725,439 B2 | 5/2010 | Doney |
| 8,244,699 B2 | 8/2012 | Bolohan et al. |
| 8,356,010 B2 | 1/2013 | Driesen |
| 8,433,684 B2 | 4/2013 | Ruiz Munoz |
| 8,566,688 B2 | 10/2013 | Tait et al. |
| 2002/0174142 A1 | 11/2002 | Demers et al. |
| 2005/0149582 A1 | 7/2005 | Wissmann et al. |
| 2005/0198630 A1 | 9/2005 | Tamma et al. |
| 2007/0239508 A1* | 10/2007 | Fazal ................. G06Q 10/0637 705/7.36 |
| 2008/0281820 A1 | 11/2008 | Do et al. |
| 2009/0106285 A1 | 4/2009 | Cheung et al. |
| 2010/0070535 A1 | 3/2010 | Irun-Briz et al. |
| 2010/0153341 A1 | 6/2010 | Driesen et al. |

* cited by examiner

*Primary Examiner* — Bai D. Vu
(74) *Attorney, Agent, or Firm* — Sterne, Kessler, Goldstein & Fox P.L.L.C.

(57) ABSTRACT

System, method, and computer program product embodiments transform data from a first version, for example an initial version of a database, to a second version, for example a subsequent version of a database. An embodiment includes modifying the metadata of the data to include transformational clauses, each of which describes how a portion of the data in the first version is transformed to data in the second version. Another exemplary embodiment includes differentiating between rename and add/delete operations to reduce the amount of transformational clauses included in the metadata. For example, rename operations can be identified by ignoring commonly-named columns between two versions, and identifying columns where the name has changed between the two versions while the data type has not changed.

17 Claims, 6 Drawing Sheets

DETECTING RENAMING OPERATIONS

CROSS REFERENCE TO RELATED APPLICATIONS

This patent application claims the benefit of U.S. Provisional Patent Application No. 61/896,875, filed Oct. 29, 2013, entitled "Detecting Renaming Operations" and U.S. Provisional Patent Application No. 61/896,978, filed Oct. 29, 2013, entitled "Schema Evolution Via Transition Information," each of which is incorporated herein by reference in its entirety.

BACKGROUND

Computer databases are a common mechanism for storing information on computer systems while providing easy access to users. A typical database is an organized collection of related information stored as "records" having "fields" of information. The organization of the data within the database is set forth using metadata that defines the structure and layout of the records and respective fields within the database. For example, a business may have a database of employees having a record for each employee. Each employee record can include fields designating specific properties or information about any employee, such as, but not limited to the employee's name, contact information, and salary.

Between the actual physical database (i.e., data stored on a storage device) and the users of the system, a database management system (DBMS) is typically provided as a software cushion or layer. In essence, the DBMS shields the database user from knowing about the underlying hardware-level details. Typically, requests from users for access to the data are processed by the DBMS. For example, information may be added or removed from data files, information may be retrieved from or updated in such files, without user knowledge of the underlying system implementation. In this manner, the DBMS provides users with a conceptual view of the database that is removed from the hardware level.

BRIEF DESCRIPTION OF THE DRAWINGS

The accompanying drawings and exhibits are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
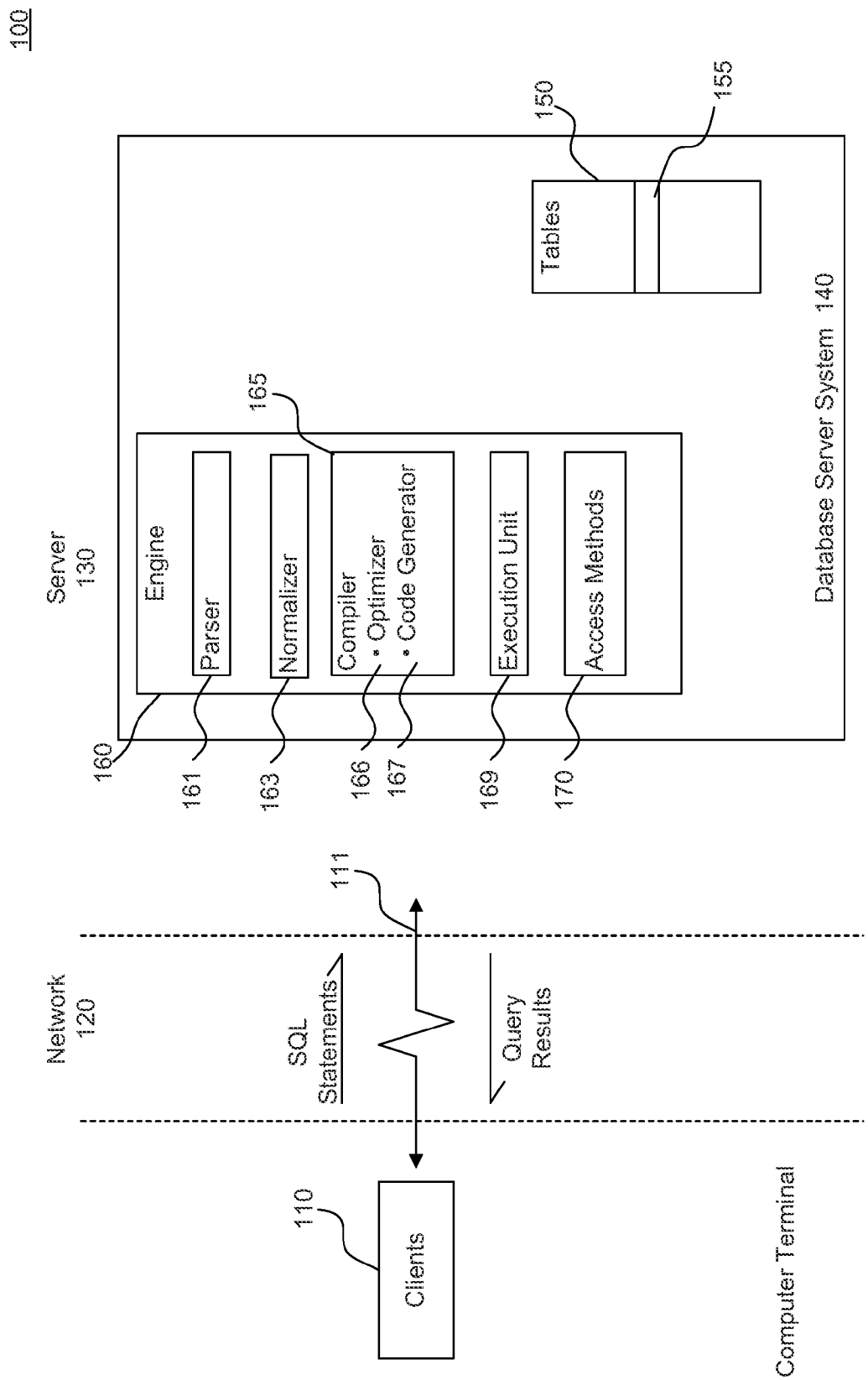
FIG. 1 is an exemplary database computing environment in which embodiments may be implemented.

FIG. 1 illustrates the general structure of a client/server database system 100 suitable for implementing embodiments (specific modifications to the system 100 for implementing other embodiments are described in subsequent sections below). As shown, the system 100 comprises one or more client computing device(s) 110 connected to a server 130 via a network 120. Specifically, the client computing device(s) 110 comprise one or more standalone terminals connected to a Database Management System 140 ("DBMS") using a conventional network 120. In an exemplary embodiment, the terminals may themselves comprise a plurality of standalone workstations, dumb terminals, or the like, or may comprise personal computers (PCs).

The database server system 130 generally operates as an independent process (i.e., independently of the client computing devices), running under a server operating system. The network 120 may be any one of a number of conventional wired and/or wireless network systems, including a Local Area Network (LAN) or Wide Area Network (WAN), as is known in the art (e.g., using Ethernet, IBM Token Ring, or the like). In an embodiment, the network 120 includes functionality for packaging client calls in the well-known Structured Query Language (SQL) together with any parameter information into a format (of one or more packets) suitable for transmission to the database server system 140. The described computer hardware and software are presented for purposes of illustrating the basic underlying desktop and server computer components that may be employed for implementing embodiments of the present invention. For purposes of discussion, the following description will present examples in which it will be assumed that there exist multiple server instances (e.g., database server nodes) in a cluster that communicate with one or more "clients" (e.g., personal computers or mobile devices). The embodiments of the present invention, however, are not limited to any particular environment or device configuration. Instead, embodiments may be implemented in any type of system architecture or processing environment capable of supporting the methodologies presented herein.

In operation, the client computing device(s) 110 store data in, or retrieve data from, one or more source database tables 150, as shown at FIG. 1. Data in a relational database is stored as a series of tables, also called relations. Typically resident on the server 130, each table itself comprises one or more "rows" or "records" (tuples) (e.g., row 155 as shown at FIG. 1). A typical database will include many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, "Position" is considered a field, "Date Hired" is considered another field, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Relational databases may implement a variant of the Structured Query Language (SQL), which is a language allowing users and administrators to create, manipulate, and access data stored in the database. SQL statements may be divided into two categories: data manipulation language (DML), used to read and write data; and data definition language (DDL), used to describe data and maintain the database. DML statements are also called queries. In operation, for example, the client computing device(s) 110 may issue one or more SQL commands to the server 130. SQL commands may specify, for instance, a query for retrieving particular data (i.e., data records meeting the query condition) from the database table(s) 150. In addition to retrieving the data from database server table(s) 150, the clients 110 also have the ability to issue commands to insert new rows of data records into the table(s), or to update and/or delete existing records in the table(s).

SQL statements or simply "queries" may be parsed to determine an access plan (also known as "execution plan" or "query plan") to satisfy a given query. In operation, the SQL statements received from the client(s) 110 (via network 120) are processed by the source database engine 160 of the DBMS 140. The source database engine 160 may itself comprises a parser 161, a normalizer 163, a compiler 165, an execution unit 169, and access method(s) 170. SQL statements may be passed to the parser 161 which employs conventional parsing methodology (e.g., recursive descent parsing). The parsed query is then normalized by the normalizer 163. Normalization includes, for example, the elimination of redundant data. Additionally, the normalizer 163 performs error checking, such as confirming that table names and column names which appear in the query are valid (e.g., are available and belong together). Finally, the normalizer 163 can also look up any referential integrity constraints which exist and add those to the query.

After normalization, the query is passed to the compiler 165, which includes an optimizer 166 and a code generator 167. The optimizer 166 performs a cost-based analysis for formulating a query plan that is reasonably close to an optimal plan. The code generator 167 translates the query plan into executable form for execution. The execution unit 169 executes the query plan using the access methods 170.

In order to increase performance for processing queries or recover from crash of the database server system, a database management system, such as DBMS 140, may replicate database tables.

In the modification of a database, alter scripts can be used to modify (e.g., add, delete, rename, move, etc.) the records and/or fields of the database. For example, the initial version of the database is created by an initial CREATE statement. The alter scripts are examined in sequence to determine the sequence of modifications to the initial version of the database to arrive at the current version. That is, the initial version of the database is stored, and the current version is obtained by determining all modifications of the initial version that are set forth in the alter scripts.

In exemplary embodiments, the modification of a database can include the modification of metadata. In these examples, the metadata can include transformation clauses to transform the records and/or fields of one version of the database to another version. For example, the transformation clauses can provide information used during the compiling process to indicate how the records and/or fields are to be modified so that the data within the records and/or fields can be maintained following the transformation.

For example, metadata of an initial version (version 1) of the database and a second version (version 2) including a transformation clause is shown below:

```
entity E   // version 1
{
    a: type Decimal;
    b: type Integer;
}
```

```
entity E   // version 2
{
    a: type Integer = trunc(previous.a);
    b: type Integer;
}
```

In this example, metadata for version 2 of the database includes the transformation clause "TRUNC(previous.a)" that informs the compiler 165 to truncate the data in column "a" during the conversion from Decimal to Integer. If the transformation clause is omitted, the compiler 165 will generally issue an error statement because the conversion from Decimal to Integer is lossy (i.e., the conversion may cause a portion of the data to be lost) conversion. In this case, the programmer will clarify how the conversion is to be made during the compiling process. Thus, the inclusion of a transformation clause prevents the loss of data when the data conversion is not lossless.

In another example, when a new column is presented, the compiler 165 may identify an error due to the compiler's inability to distinguish add/delete operations from renaming operations. For example, metadata of an initial version (version 1) of the database and a second version (version 2) including an error statement is shown below:

```
entity E   // version 1
{
    c:  type Decimal;
    x:  type Float;
}
```

```
entity E   // version 2
{
    c:  type Decimal;
    y:  type Long; //syntax error: no initial value provided!
}
```

In addressing this error, the programmer can indicate that a column was deleted (column "x") and a new column was added (column "y") by defining an initial value (where the initial value can be a single value or a set of values) for the new column as shown below in version 2a:

```
entity E   // version 2a
{
    c: type Decimal;
```

```
        y: type Long = initial;    // add new column
    }
```

Alternatively, the programmer can indicate that the column (column "x") was renamed (to column "y") by defining the initial value for the new column as the values of a column in a previous version of the database as shown below in version 2b:

```
entity E    // version 2b
{
    c: type Decimal;
    y: type Long = previous.x;    // make renaming explicit!
}
```

In another example, the compiler includes a comment requesting that the programmer confirm that a column is to be deleted:

```
entity E    // version 2
{
    c:  type Decimal;
    y:  type Long; //syntax error: no initial value provided!
    delete x;   // reconfirm deletion of a column
}
```

The metadata can include transformation clauses that describe more complex conversions. For example a more complex transformation clause is shown below in version 2 of entity E:

```
            entity E    // version 1
            {
              Firstname: type String;
              Lastname: type String;
            }
```

```
entity E    // version 2
{
  Name: type String = previous.Firstname + previous.Lastname;
}
```

The transformation clauses can be implemented without the need for sophisticated comparing algorithms. For the most part, the compiler need only compare the types of the variables being transformed to determine if there will be an error due to a lack of an initial value or a loss of data. For example, if the compiler finds a variable without an initial value, it simply adds a default transformation clause to that column, e.g.

```
            entity E    // version 1
            {
                a: type Integer = trunc(previous.a);
                c: type Decimal;
                d: type Date;
            }
``` will be transformed internally into:

```
entity E    // version 2
{
    a: type Integer = trunc(previous.a);
    c: type Decimal = previous.c;
    d: type Time = previous.d;    // Syntax error: no
lossless conversion
    x: type Integer = previous.x;    // Syntax error: x is not
defined
}
```

All conversions causing the loss of data (see variable "d") or missing initial values (see variable "x") can be detected by a common type check algorithm.

Figure 2:
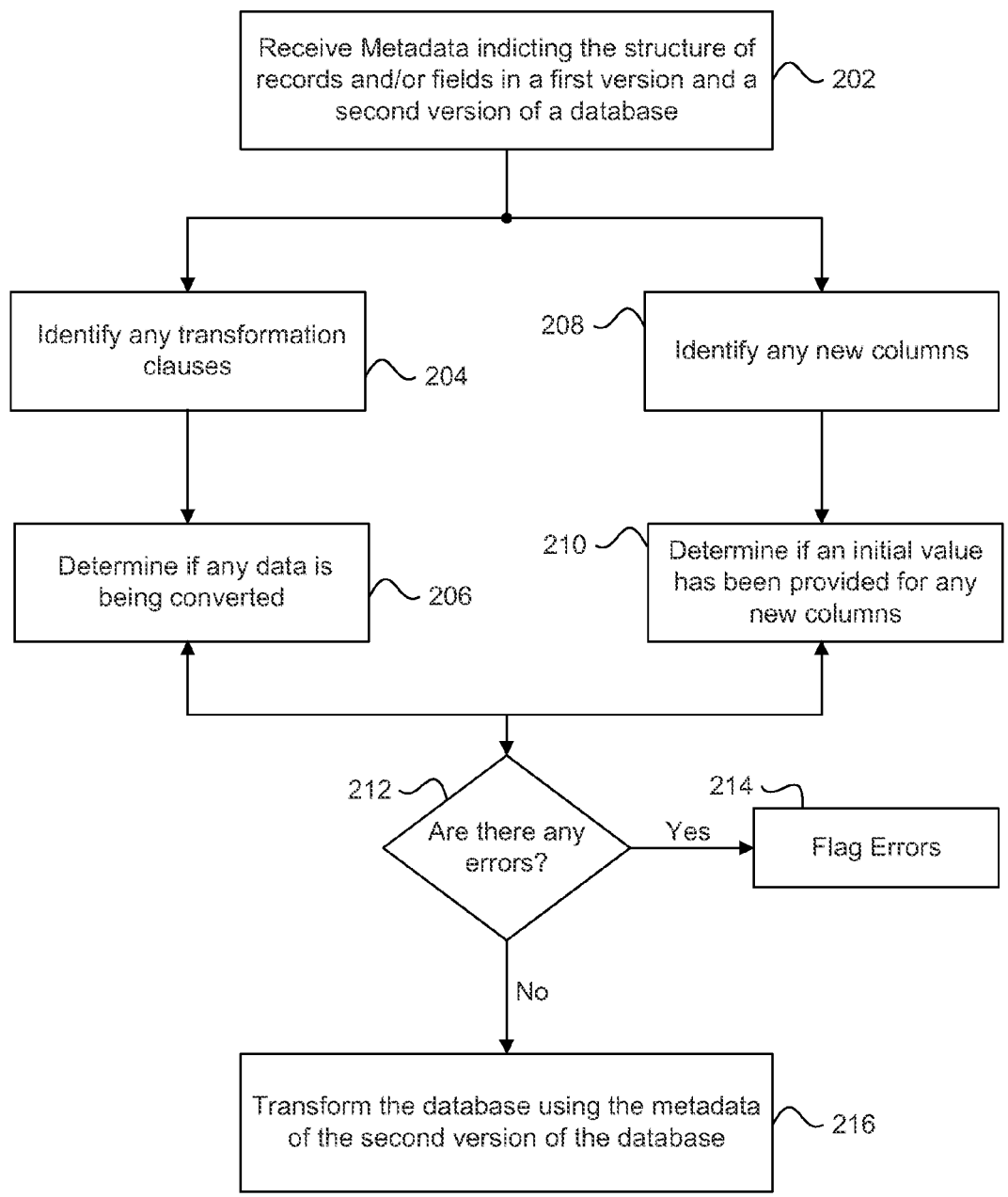
FIG. 2 is a flowchart illustrating a verification process, which is a process for verifying and executing database metadata language extensions, according to an example embodiment.

FIG. 2 illustrates a flowchart 200 of a verification method in accordance with an exemplary embodiment of the present disclosure. Flowchart 200 can be performed by processing logic that can comprise hardware (e.g., circuitry, dedicated logic, programmable logic, microcode, etc.), software (e.g., instructions run on a processing device), or a combination thereof. The steps of the method of flowchart 200 are not limited to the order described below, and the various steps may be performed in a different order. Further, two or more steps of the method of flowchart 200 may be performed simultaneously with each other.

At step 202, in an embodiment, metadata can be received that indicates the structure of records and/or fields of a database. In an embodiment, two versions of the data can be received. The first version can indicate the structure of the database at one point in time and the second version can indicate the structure of the database at a second point in time. In an embodiment, the metadata can be received by a compiler.

At step 204, any transformation clauses in the second version of the metadata can be identified. For example, this can be identified by the compiler. Transformation clauses, as described above, provide a mechanism to transform data in different ways, for example, by converting data from one format to another, modifying the values stored, clearing data, etc. For example, transformation clauses can be used to convert a decimal number into an integer or a name into a first and last name.

At step 206, the transformation clauses are analyzed to determine is any data is being converted from one format to another. In an embodiment, a compiler can perform the analyzing.

At step 208, the second version of the metadata can be analyzed to identify if any new columns of data are being added. For example, if the first version of metadata included columns "a" and "b", and the second version of metadata attempted to define column "c", column "c" would be identified as a new column.

At step 210, the initial value for each new column is identified. For example, a new column may have no initial value set, a specific initial value set for all rows within that column, or the initial value may be set to a function of one or more values from other columns in the database.

At step 212, any errors that were detected in either step 206 or 210 are flagged. In an embodiment, transformation clauses that cause data to be lost may be flagged. For example, transforming a column that contained decimal data into a column that contains integer data may be flagged. With such a transformation, it is unclear how data that contained a decimal portion should be handled—should it be truncated, rounded, rounded up? In an embodiment, new columns without an initial value can be flagged indicating an error. When a new column is identified, but no initial value is specified, an error can be flagged to indicate that an initial value needs to be set. This can prompt the user to indicate whether the column was meant to be a new column or merely an old column that has been renamed.

At step 214, in an embodiment, if any errors have been detected, then the second version of metadata can be modified for each flagged instruction. For example, as illustrated above, a comment may be inserted after the line of metadata that flagged an error indicating what the error was. These comments can allow a user to review the metadata and fix/clarify any metadata that is unclear.

At step 216, in an embodiment, if there are no errors, then a database can be transformed from the first version to the second version using the transformation clauses in the second version of the metadata.

In an exemplary embodiment, the transformation clauses can describe transformations of data from the previous version to the current version. As will be described below, these transformation clauses can then be accumulated to migrate data from an arbitrary version to another version, which allows the programmer to incrementally describe changes being made to the data, as well as more quickly identify and correct any errors in the transformation changes. For example, if a column is misplaced or the data in a column is not in the correct format, it is easy for the programmer to review the transformation clauses that transformed the data from the previous version of the database to the current version to fix errors.

In addition, this also allows the compiler to identify additional types of errors. For example, if a conversion has been applied to one version, it is very unlikely that this conversion will be applied again. Thus, the compiler can flag these errors, and allow the programmer to either remove the duplicate or indicate that the conversion is correct, for example by adding a key word like "dacapo" to the transformation clause.

Below is an illustration. In this example, in version k, the following transformation clauses are used:

```
entity E    // version k
{
    a: type Integer = trunc(previous.a);
    c: type Decimal;
    d: type Date;
}
```

In version k+1, the programmer has inserted the following transformation clauses:

```
entity E    // version k+1
{
    a: type Integer = trunc(previous.a);
    c: type Decimal;
}
```

When the programmer tries to compile the transformation clauses for version k+1, the compiler can flag that an error has been encountered. In this case, it would indicated that the "trunc(previous.a)" transformation clause was performed in the previous version. The programmer could then either remove or modify the transformation clause to fix this error, or, as illustrated below, append a keyword to the end of the transformation clause to indicate that it has intentionally been repeated:

```
entity E    // version k+1
{
    a: type Integer = trunc(previous.a) dacapo;
    c: type Decimal;
}
```

As an alternative, rather than requiring that transformation clauses only refer to data in the previous version, the compiler could assume that the transformation clauses refer to the previous version unless otherwise stated. For example:

```
entity E    // version k+1
{
    a: type Integer = trunc(k−1.a);
    c: type Decimal;
}
``` may indicate that the data in column a is a truncated version of the data in column a of version k−1 of the database, rather than version k.

Figure 3:
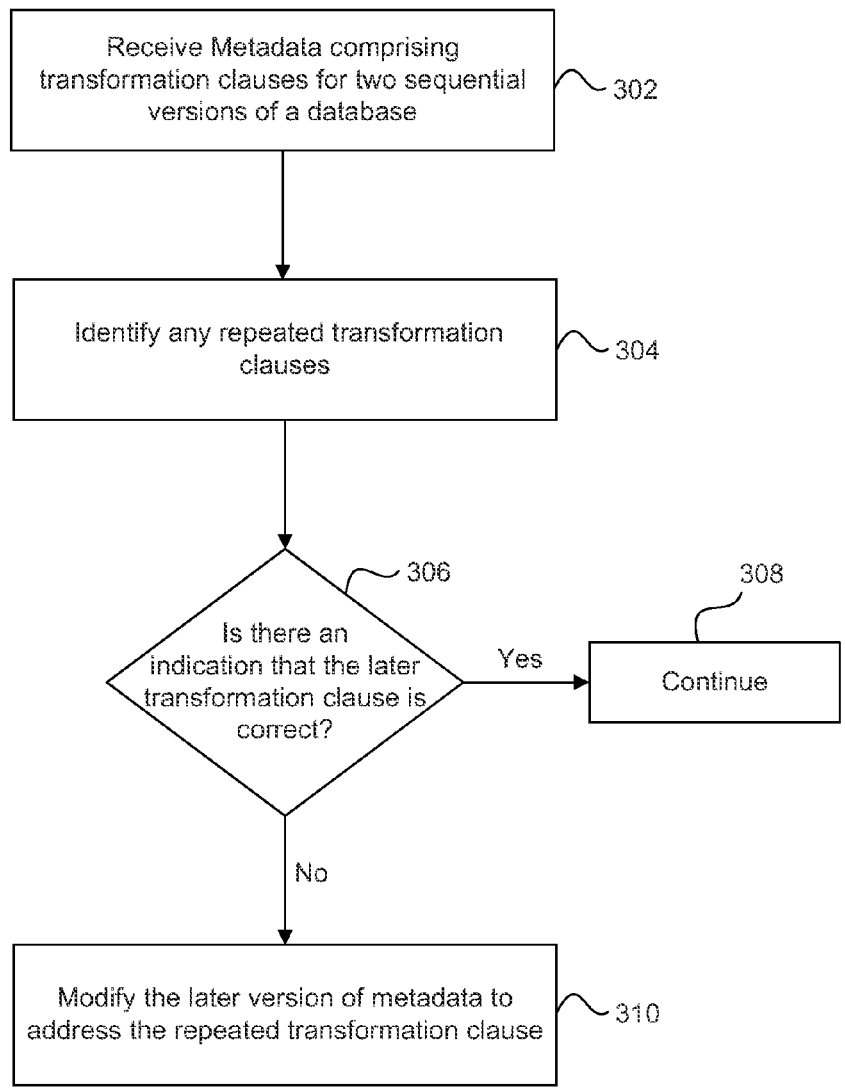
FIG. 3 is a flowchart illustrating a process for handling incremental versions of a database using database metadata language extensions, according to an example embodiment.

FIG. 3 illustrates a flowchart 300 of a method to handle incremental versions of a database in accordance with an exemplary embodiment of the present disclosure. Flowchart 300 can be performed by processing logic that can comprise hardware (e.g., circuitry, dedicated logic, programmable logic, microcode, etc.), software (e.g., instructions run on a processing device), or a combination thereof. The steps of the method of flowchart 300 are not limited to the order described below, and the various steps may be performed in a different order. Further, two or more steps of the method of flowchart 300 may be performed simultaneously with each other.

At step 302, in an embodiment, metadata can be received that indicates the structure of records and/or fields of a database. In an embodiment, two versions of the data can be received. The first version can indicate the structure of the database at one point in time and the second version can indicate the structure of the database at a second point in time. In an embodiment, the metadata can be received by a compiler.

At step 304, in an embodiment, the first and second versions of metadata are compared. Any transformation clauses that cause the same transformation on a column are identified. For example, as illustrated above, two transformation clauses, one in each version of the metadata, that attempt to take the data in column a, truncate it, and store it back into column a will be identified.

At step 306, in an embodiment, each identified repeated transformation clause is checked to see if the user indicated that the second transformation clause is correct. For example, if both versions of metadata attempt to take the data in column "a", truncate it, and store it into column "b", the user may indicate that this is the correct action. It may be that after the first version of metadata was created, additional data was added to column "a," and that the user wanted to also move this additional data to column "b" in version 2 of the metadata. In an embodiment, the user can indicate this by modifying the comments next to the transformation clause in the second version of the metadata, for example by adding the flag "decapo."

At step 308, in an embodiment, if the user identified each identified repeated transformation as intentional, then the second version of the metadata can be used without modification.

At step 310, in an embodiment, each identified repeated transformation clause that the user did not indicate was intentional is modified. In an embodiment, each repeated transformation clause that has not been flagged as intentional is flagged as an error. This allows the user to review the second version of metadata, correct any errors, flag any intentional repeated transformation clauses, and continue. In an embodiment, each repeated transformation clause that has not been flagged can be modified to use the version of data in the version of the database that existed before the first version of metadata was created. Thus the two transformation clauses, one in each version of metadata, are modified such that they do identical operations with identical data.

As described above, the transformation clauses can describe transformations of data from the previous version to the current version. These transformation clauses can then be accumulated to migrate data from an arbitrary version to another version.

The transformation clauses can be used to compute a change log entry, for example during the compilation process.

Consider the following example, where transformation clauses have been added to version 2 of an entity E to transform it from version 1:

```
entity E   // version 1
{
    a: type String;
    b: type Integer;
    x: type Long;
    c: type Decimal;
}
```

```
entity E // version 2
{
    a: type Integer = string_to_int(previous.a);
    c: type Decimal;
    y: type Long = previous,x;
    d: type Date = initial;
}
```

For the transition from version 1 to version 2 the following change log can be computed:

```
change log E
{
    ...
    version 1 -> 2
    {
        <change>a: Integer = string_to_int(previous.a);
        <remove>b;
        <rename>y = previous.x;
        <add>d: Date = initial;
    }
    ...
}
```

As illustrated above, the change log describes all of the transformations that happen to data in version 1 in order to create version 2. As can be seen above, since column c was not changes, it does not appear in the change log. Changes to the other columns are identified.

Once change logs are created for multiple versions of the database, they can be combined to create the transformation clauses, described above, needed to transform the data in an arbitrary version to the data in a future arbitrary version. For example, below are three changes logs for a database to transform it from version 0 to version 3:

```
change log E
{
    version 0 -> 1
    {
        <add>a: type String;
        <add>b: type Integer;
        <add>x: type Decimal;
        <add>c: type Decimal;
    }
    version 1 -> 2
    {
        <change>a: Integer = string_to_int(previous.a);
        <remove>b;
        <rename>y = previous.x;
        <add>d: Date = initial;
    }
    version 2 -> 3
    {
        <change>c: Float = previous.c;
        <change>y: Integer = trunc(previous.c);
        <change>b: Date = initial;
    }
}
```

If a user made a change to data in version 1, and wanted to update a database in version 3, without having to create all the intermediate versions (in this case version 2), the change logs can be used. By combining the change logs for the 1->2 transformation and the 2->3 transformation, a set of transformation clauses can be created that would transform the data in version 1 into the format used in version 3. This could look like:

```
E3.a = string_to_int(E1.a);
E3.b = initial;
E3.c = E1.c;
E3.y = trunc(E1.x);
E3.d = intitial;
```

The foregoing is further described in Exhibits A and B, which form part of this application.

Figure 4:
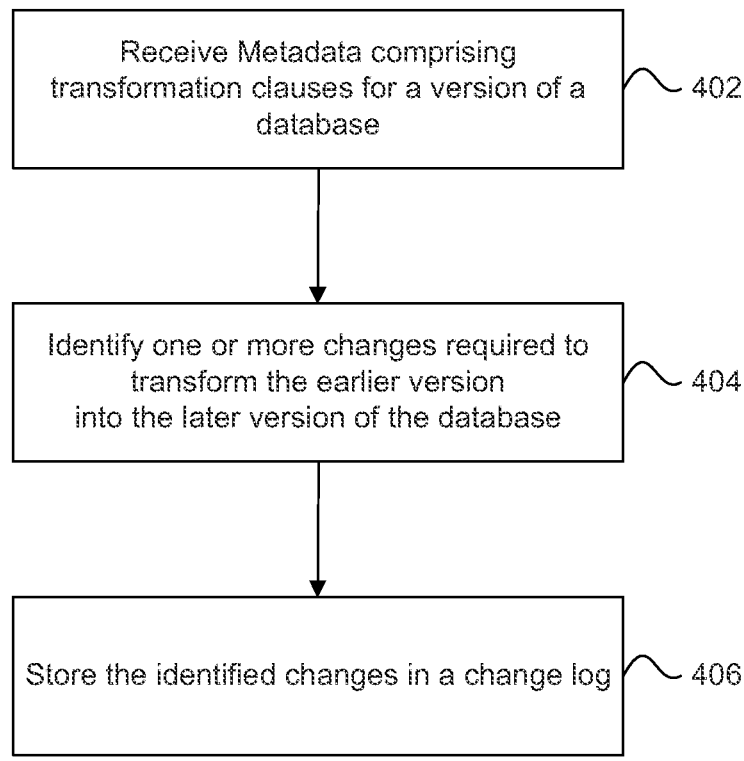
FIG. 4 is a flowchart illustrating a change log creation process, according to an exemplary embodiment.

FIG. 4 illustrates a flowchart 400 of a change log method to create change logs identifying changes necessary to transform one version of the database into another in accordance with an exemplary embodiment of the present disclosure. Flowchart 400 can be performed by processing logic that can comprise hardware (e.g., circuitry, dedicated logic, programmable logic, microcode, etc.), software (e.g., instructions run on a processing device), or a combination thereof. The steps of the method of flowchart 400 are not limited to the order described below, and the various steps may be performed in a different order. Further, two or more steps of the method of flowchart 400 may be performed simultaneously with each other.

At step 402, in an embodiment, metadata can be received that indicates the structure of records and/or fields of a database and any transformations required to change the database from a first version to a second version. In an embodiment, the metadata can be received by a compiler.

At step 404, in an embodiment, changes are identified that are required to transform the database as it existed before the metadata is applied to the version of the database that existed after the metadata is applied. For example, columns that are unique to the new version may be identified as new. If values in a column have been modified, then the column may be identified as changed, and the appropriate modification may be identified. If a column was moved, then the column may be identified as renamed, and the prior column may be identified. Or if a column existed prior to the application, but does not exist afterward, it may be identified as deleted.

At step 406, in an embodiment, once all the changes have been identified they can be placed in a change log indicating that they are the modifications required to change the database from a first version to a second version. These change logs can be used to create larger change logs. For example, the change logs for modifying version 1 of a database into version 2 and for modifying version 2 of a database into version 3 can be combined. The combined change log indicated the modifications needed to transform version 1 of the database into version 3. The combined change log can then be used to create the metadata with transformation clauses needed to directly transform the database from version 1 to version 3, skipping the intermediate step of creating version 2.

In an exemplary embodiment, compiler 165 is configured to implement a rename operation detection algorithm to provide the compiler 165 with the ability to distinguish add/delete operations from rename operations.

The rename operation detection algorithm includes the comparison of the metadata of two versions of the database to identify commonly-named columns between the two versions. This comparison does not take into consideration the order of the columns (i.e., changes in order are irrelevant). The columns identified as commonly-named columns are then ignored by the compiler 165 during a subsequent comparison between the differently-named columns (i.e., the remaining columns). In this subsequent comparison, the compiler 165 considers the type of each column and their respective order within the database. Based on this subsequent comparison, the compiler 165 identifies the columns as either a renamed column, or a column that has been added or deleted. For example, if the compiler 165 determines that the type at a particular position within the column order remains constant between the two versions, the new column is identified as a renamed column. Alternatively, if the compiler 165 determines that the type at a particular position has changed, the compiler 165 identifies the column at this position in the previous version as having been deleted, and identifies the column at the position in the later version as having been added.

For example, metadata of an initial version (version 1) of the database and a second version (version 2) is shown below:

```
entity E   // version 1
{
    a: type String;
    b: type Decimal;
    x: type Decimal;
    c: type String;
}
```

```
entity E   // version 2
{
    c: type Integer;
    d: type Float;
    y: type Decimal;
    a: type String;
}
```

In implementing the rename operation detection algorithm, the compiler 165 ignores the columns determined to be commonly named between the two versions.

Metadata of the initial version (version 1) and the second version (version 2) having ignored columns is shown below, where strike-through formatting indicates the ignored columns. As discussed above, the determination of commonly named columns is independent of changes in the order of the columns.

```
entity E   // version 1
{
    a: type String;
    b: type Decimal;
    x: type Decimal;
    c: type String;
}
```

```
entity E // version 2
{
    c: type Integer;
    d: type Float;
    y: type Decimal;
    a: type String;
}
```

After the columns have been ignored, the compiler 165 performs a subsequent comparison between the remaining columns (i.e., the differently-named columns). In this second comparison, the compiler 165 considers the type of each column and their respective order within the database. For example, the compiler 165 will compare the type of column "b" of version 1 with the type of column "d" of version 2, and compare the type of column "x" of version 1 with the type of column "y" of version 2.

Based on this subsequent comparison, the compiler 165 identifies the columns as either a renamed column, or a column that has been added or deleted. For example, the type of data of the columns at the second position (e.g., "b" and "d" of versions 1 and 2, respectively) has changed from Decimal to Float. In this example, the compiler 165 determines that column "b" has been deleted and column "d" has been added due to the change in the type. With respect to the columns at the third position (e.g., "x" and "y" of versions 1 and 2, respectively), the type has not changed between the two versions (e.g., the type is Decimal in both version 1 and version 2). Therefore, the compiler 165 determines that column "x" has been renamed as column "y" in version 2. That is, column "y" is identified as a renamed column "x". In implementing the algorithm, the compiler 165 can identify rename operations without the explicit indication of a rename operation using a transformation clause (e.g., y: type Decimal=previous.x).

Figure 5:
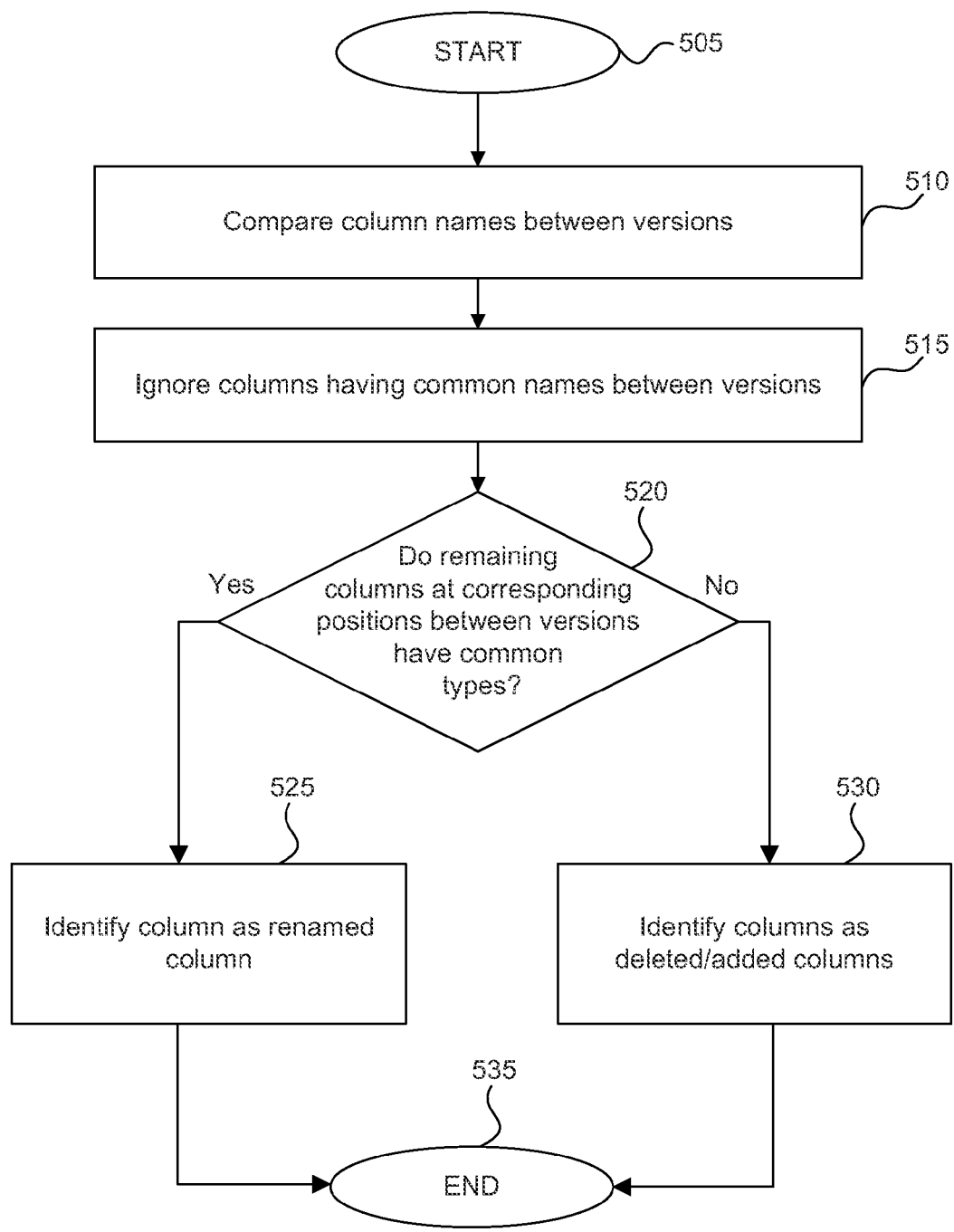
FIG. 5 is a flowchart illustrating a rename operation detection process, according to an exemplary embodiment.

FIG. 5 illustrates a flowchart 500 of a rename operation detection method in accordance with an exemplary embodiment of the present disclosure. Flowchart 500 can be performed by processing logic that can comprise hardware (e.g., circuitry, dedicated logic, programmable logic, microcode, etc.), software (e.g., instructions run on a processing device), or a combination thereof. The steps of the method of flowchart 500 are not limited to the order described below, and the various steps may be performed in a different order. Further, two or more steps of the method of flowchart 500 may be performed simultaneously with each other.

The method of flowchart 500 begins at step 505, and transitions to step 510, where a comparison is made between two versions of a database to identify commonly-named columns between the two versions. For example, the compiler 165 can be configured to compare the metadata of the two versions of the database to identify commonly-named columns between the versions. In this example, the compiler 165 can be configured to identify the commonly-named columns irrespective of the positions of the columns within the database.

After step 510, the flowchart 500 transitions to step 515, where columns identified as commonly-named columns are ignored during one or more steps of the rename operation detection method. For example, the compiler 165 can be configured to ignore columns that have been identified by the compiler 165 as being commonly named columns between the versions. In an exemplary embodiment, commonly-named columns may be ignored while differentiating one or more renamed column from one or more deleted/added columns.

After step 515, the flowchart 500 transitions to step 520, where the type of each of the remaining (i.e., non-ignored) columns between the two versions are compared to differentiate between add/delete operations and renaming operations. For example, the compiler 165 can be configured to compare the type of each of the remaining (i.e., non-ignored) columns between the two versions while taking the position of columns into consideration. That is, the type of a column in a first version is compared with the type of a column located at the same position in a second version.

If the compiler 165 determines that the type of column remains constant at the same position within the two versions (YES at step 520), the flowchart 500 transitions to step 525, where the column can be identified as a renamed column. For example, the compiler 165 can be configured to identify the performance of a renaming operation on a column when the type of the columns between the versions remains the same.

If the compiler 165 determines that the type of column has changed at the same position within the two versions (NO at step 520), the flowchart 500 transitions to step 530, where the column (e.g., the column in the later version) can be identified as a deleted/added column. For example, the compiler 165 can be configured to identify the performance of a delete operation on a column (e.g., on the earlier version of the column) and the performance of an add operation on a column (e.g., on the later version of the column) when the type of the columns changes between the versions of the database. That is, when the type changes, the compiler 165 can determine that a column in the earlier version was deleted and then new column was added in the later version.

Following steps 525 and 530, the flowchart 500 transitions to step 535, where the flowchart 500 ends. After step 535, the flowchart 500 may return to step 505 to perform another rename operation detection process.

Figure 6:
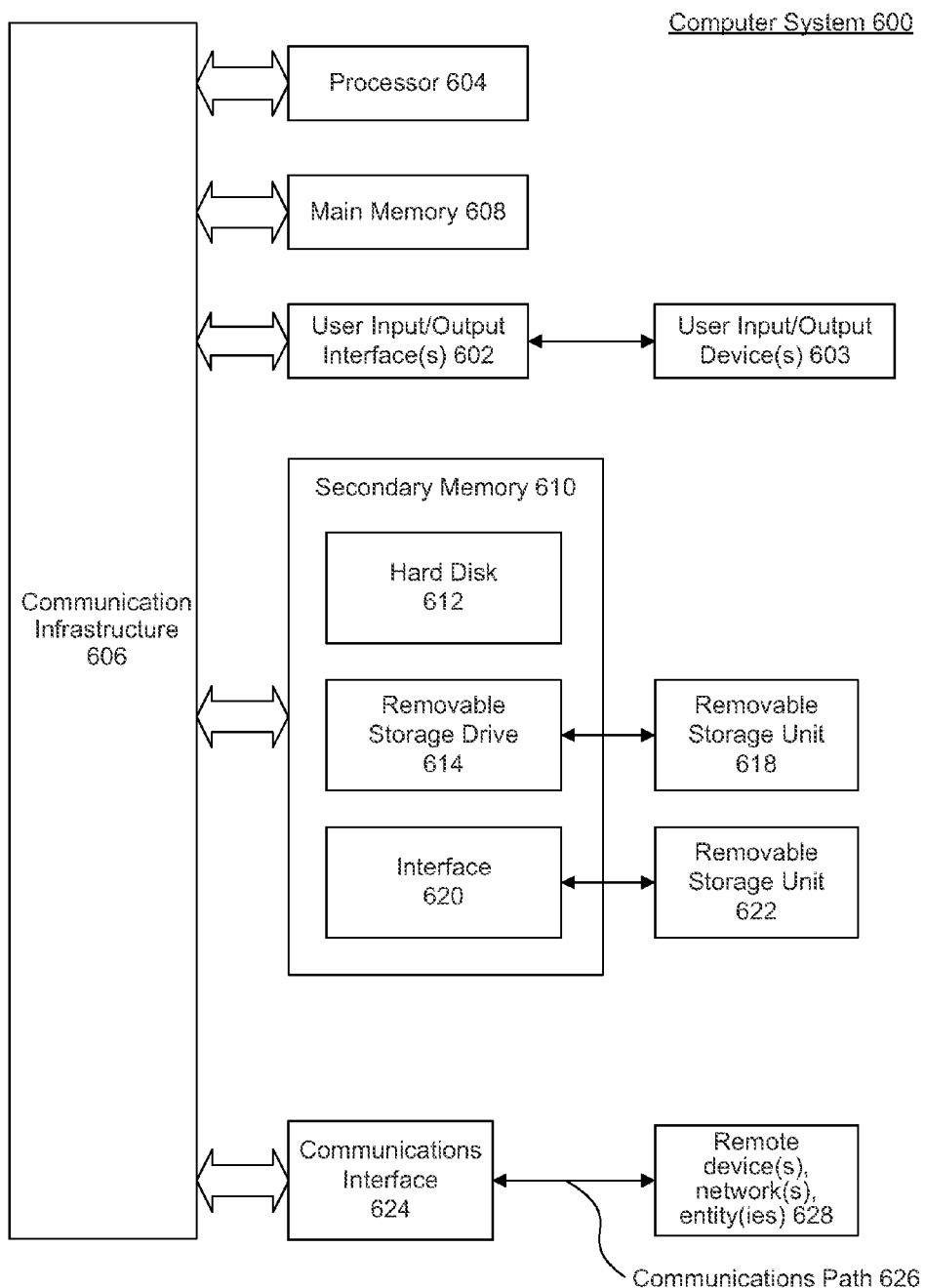
FIG. 6 illustrates an example computer useful for implementing components of various embodiments.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 6. In particular, embodiments may operate with software, hardware, and/or operating system implementations other than those described herein.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented rename detection method, comprising:
    comparing, by at least one processor, metadata of a first version of a database with metadata of a second version of the database, wherein the metadata of the first version is associated with a first column of the first version of the database, and wherein the metadata of the second version is associated with a second column of the second version of the database;
    identifying, by the at least one processor, commonly-named columns between the first and the second versions of the database based on the comparison, wherein the commonly-named columns between the first and second versions are different versions of the same columns;
    comparing, by the at least one processor, a data type of the first column of the first version with a data type of the second column of the second version, wherein the identifying determined that the first and second columns are not commonly named; and
    responsive to the comparing of the data types, determining, by the at least one processor, whether the first column has been renamed to a name of the second column based on the comparison of the data types of the first and the second columns to enable the at least one processor to identify and log a corresponding modification to transform the first column of the first version into the second column of the second version when the database of the first version is to be converted to the second version.

2. The method of claim 1, wherein a position of the first column within the first version corresponds to a position of the second column within the second version.

3. The method of claim 1, wherein the determining further comprises:
    determining that the first column of the first version has been renamed to the name of the second column of the second version when the data type of the first column is the same as the data type of the second column.

4. The method of claim 3, wherein a position of the first column within the first version corresponds to a position of the second column within the second version.

5. The method of claim 1, wherein the determining further comprises:
    determining that the first column of the first version has been deleted and the second column of the second version of the metadata has been added when the data type of the first column is different from the data type of the second column.

6. The method of claim 5, wherein a position of the first column within the first version corresponds to a position of the second column within the second version.

7. A system, comprising:
    a memory; and at least one processor coupled to the memory and configured to:
        compare metadata of a first version of a database with metadata of a second version of the database, wherein the metadata of the first version is associated with a first column of the first version of the database, and wherein the metadata of the second version is associated with a second column of the second version of the database;
        identify commonly-named columns between the first and the second versions of the database based on the comparison, wherein the commonly-named columns between the first and second versions are different versions of the same columns;
        compare a data type of the first column of the first version with a data type of the second column of the second version, wherein the identifying determined that the first and second columns are not commonly named; and
        responsive to the compare of the data types, determine whether the first column has been renamed to a name of the second column based on the comparison of the data types of the first and the second columns to enable the at least one processor to identify and log a corresponding modification to transform the first column of the first version into the second column of the second version when the database of the first version is to be converted to the second version.

8. The system of claim 7, wherein a position of the first column within the first version corresponds to a position of the second column within the second version.

9. The system of claim 7, wherein the at least one processor is further configured to:
- determine that the first column of the first version has been renamed to the name of the second column of the second version when the data type of the first column is the same as the data type of the second column.

10. The system of claim 9, wherein a position of the first column within the first version corresponds to a position of the second column within the second version.

11. The system of claim 7, wherein the at least one processor is further configured to:
- determine that the first column of the first version has been deleted and the second column of the second version of the metadata has been added when the data type of the first column is different from the data type of the second column.

12. The system of claim 11, wherein a position of the first column within the first version corresponds to a position of the second column within the second version.

13. The system of claim 7, wherein the at least one processor comprises a compiler, the compiler configured to perform at least one of the compare of the metadata, the compare of the data types, the identify, and the determine.

14. A non-transitory computer-readable device having instructions stored thereon that, when executed by at least one computing device, causes the at least one computing device to perform operations comprising:
- comparing metadata of a first version of a database with metadata of a second version of the database, wherein the metadata of the first version is associated with a first column of the first version of the database, and wherein the metadata of the second version is associated with a second column of the second version of the database;
- identifying commonly-named columns between the first and the second versions of the database based on the comparison, wherein the commonly-named columns between the first and second versions are different versions of the same columns;
- comparing a data type of the first column of the first version with a data type of the second column of the second version, wherein the identifying determined that the first and second columns are not commonly named; and
- responsive to the comparing of the data types, determining whether the first column has been renamed to a name of the second column based on the comparison of the data types of the first and the second columns to enable the at least one processor to identify and log a corresponding modification to transform the first column of the first version into the second column of the second version when the database of the first version is to be converted to the second version.

15. The computer-readable device of claim 14, wherein a position of the first column within the first version corresponds to a position of the second column within the second version.

16. The computer-readable device of claim 14, wherein the determining further comprises:
- determining that the first column of the first version has been renamed to the name of the second column of the second version when the data type of the first column is the same as the data type of the second column.

17. The computer-readable device of claim 14, wherein the determining further comprises:
- determining that the first column of the first version has been deleted and the second column of the second version has been added when the data type of the first column is different from the data type of the second column.

\* \* \* \* \*